United States Patent [19]
Panttaja

[11] 4,389,812
[45] Jun. 28, 1983

[54] HERBICIDE WAND AND METHOD FOR MAKING

[76] Inventor: Swen A. Panttaja, 6446 S. Reed, Reedley, Calif. 93654

[21] Appl. No.: 295,697

[22] Filed: Aug. 24, 1981

[51] Int. Cl.³ ............................................. A01M 21/00
[52] U.S. Cl. ........................................................ 47/1.5
[58] Field of Search ................... 47/1.5; 401/268, 198, 401/196, 289, 264, 272; 119/157; 239/44, 45

[56] References Cited
U.S. PATENT DOCUMENTS

| | | | |
|---|---|---|---|
| 1,545,656 | 7/1925 | Hothersall | 401/198 |
| 2,102,749 | 12/1937 | Salvesen | 401/264 |
| 3,442,739 | 5/1969 | Johnson | 401/198 |
| 4,187,638 | 2/1980 | Hardy et al. | 47/1.5 |
| 4,309,842 | 1/1982 | Jones | 47/1.5 |

OTHER PUBLICATIONS

Hite, D., "Here's How to Make a Rope Wick Applicator" from *Progressive Farmer*, Dec. 1979, pp. 34 & 35.

*Primary Examiner*—James R. Feyrer
*Assistant Examiner*—D. D. DeMille
*Attorney, Agent, or Firm*—Huebner & Worrell

[57] ABSTRACT

A herbicide wand and method for making, the wand having a tubular member adapted to receive liquid herbicide and provided with a plurality of bores of predetermined diameter, an emitter of braided cord having a diameter which is greater than the diameter of the bores when untensioned and smaller when tensioned, the emitter being threaded through the member in slidable engagement with its wall so that the member has portions within the member immersed in the herbicide and has portions outward of the member to apply the herbicide and the method including forming a plurality of emitters from a length of such cord with each emitter having an integral needle for threading it through such bores.

2 Claims, 7 Drawing Figures

HERBICIDE WAND AND METHOD FOR MAKING

BACKGROUND OF THE INVENTION

1. Field of the Invention

The present invention relates to a herbicide wand and a method for making the same, and more particularly to such a wand for manually wiping liquid systemic herbicide on plants to be destroyed and to a method for installing herbicide emitters of braided material in the wand.

2. Description of the Prior Art

The advent of systemic herbicides has revolutionized weed control in agriculture. Several of such herbicides are so potent that when they are wiped on the weeds they are translocated in minute amounts throughout the weeds, including their roots, to the complete destruction of the growing tissue. Great care must be exercised, however, to avoid inadvertently applying such herbicides to farm crops. Herbicide wands have been developed for wiping such herbicides on weeds intended to minimize inadvertent crop application. Further, although systemic herbicides are effective, they are relatively expensive so that wasting of such herbicides cannot be tolerated even if inadvertent application to crops does not occur.

PRIOR ART STATEMENT

In compliance with 37 C.F.R. §1.97 and §1.98 attention is invited to wands manufactured and sold by the applicant more than a year before this application, such a wand being hereinafter referred to as the "prior wand" and being the closest prior art of which the applicant is aware. Essentially the prior wands consisted of an elongated tubular handle having a tubular distributor head extended from an end thereof at approximately 135° with respect thereto. The handle and head have interconnected reservoirs for herbicide and a releasably closable filler opening. During use, the tubular handle is held at approximately 45° with respect to the horizontal and manipulated to drag the head back and forth over the weeds to be killed in substantially horizontal attitude. The head has a multiplicity of emitter orifices through which herbicide is exuded for weed application. Each orifice has a grommet secured therein and a wick extended therethrough. Such grommets have proved unsatisfactory although the best available for the purpose prior to the present invention. During use, such grommets loosen and leak causing dripping and consequently inadvertent herbicide application to crops. In an effort to obviate the problem, the grommets of the prior wands have been cemented in their emitter orifices and the wicks cemented in the grommets. Such cemented installation has also proved unsatisfactory. It either leaks or interferes with wick flowing action so that herbicide is misapplied or inadequately applied. Further, such cemented installation is rigid, concentrates the wear points on the wicks, does not permit the wicks to adjust themselves during use, nor to be adjusted, and with the grommets constitute a substantial portion of the cost of the wands. The essence of the present invention resides in the discovery of a simplified wand that is more economical than the prior wands and of improved operational characteristics.

SUMMARY OF THE INVENTION

It is an object of the present invention to provide an improved herbicide wand and an improved method for making such a wand.

Another object is to provide such a wand having a reservoir for liquid herbicide, the reservoir having a wall through which a wick-like herbicide emitter of braided cord extends and the emitter being amply supplied with herbicide from the reservoir without the passage of herbicide therefrom in excess of that required for applications to weeds to be destroyed.

Another object is to provide such a wand wherein the emitter is somewhat movable in relation to the reservoir wall to adjust the disposition of a portion of the emitter externally of the wall.

Another object is to provide such a wand having the foregoing advantages which is of extremely single and economical construction.

Another object is to provide a method for rapidly, conveniently, and economically installing the emitter through the wall of the reservoir in properly fitted relation to provide the above stated advantages.

A further object is to provide a herbicide wand having improved elements and arrangements thereof which is rugged, convenient to use, and fully effective in accomplishing its intended purposes and to provide a method for making a wand having these and other advantages.

BRIEF DESCRIPTION OF THE DRAWINGS

FIGS. 3A, B, D and E being perspective views of the head, FIGS. 3B, D and E also depicting an emitter used therewith; and FIG. 3C showing a length of cord which forms a plurality of such emitters.

DESCRIPTION OF THE PREFERRED EMBODIMENT

Figure 1:
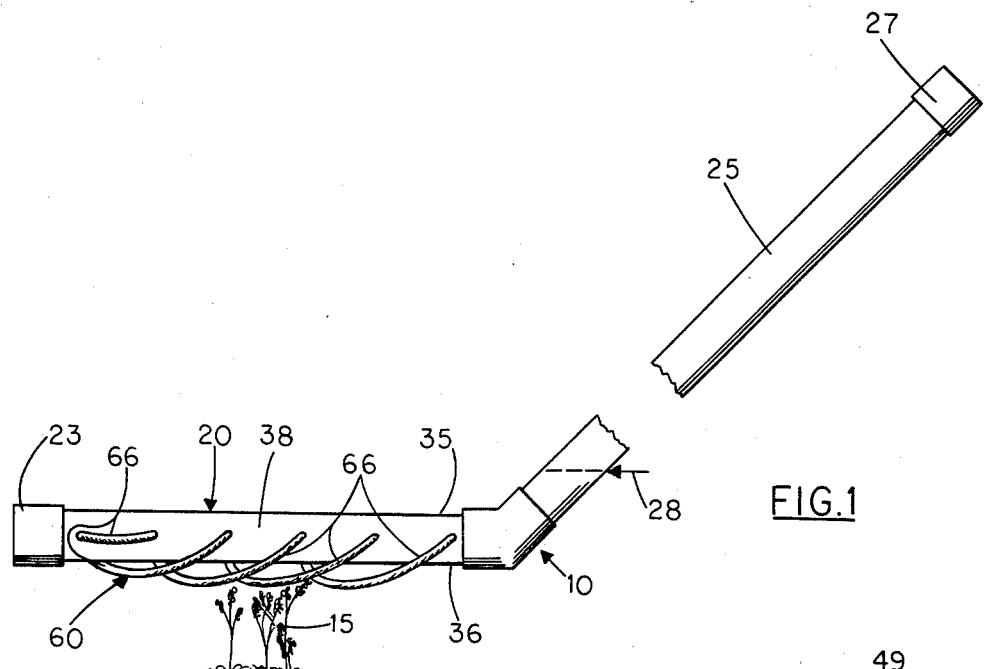
FIG. 1 is a rear elevation of a herbicide wand, which embodies the principles of the present invention, in use in a representative operating environment.

Referring more particularly to the drawings, in FIG. 1, is shown a herbicide wand 10, which embodies the principles of the present invention, being used to wipe herbicide, typically a systemic herbicide, onto weeds 15 to be destroyed thereby.

The wand 10 has an elongated tubular distributor head 20 which has a wall 21 and is closed by a cap 23 at one end, the other end of the head being provided with a 45° elbow. An elongated tubular handle 25 of any suitable length extends from the elbow oppositely of the head and is closed oppositely of the elbow by a filler cap 27. Preferably, the head and handle are lengths of standard pipe of polyvinyl chloride material (PVC) and the elbow and the caps are standard fittings of the same material. All of these elements, except the filler cap, are fixedly assembled in the depicted arrangement and in fluid-tight relation in any suitable manner. The filler cap is slidably fitted to the handle so as to be frictionally retained thereon while being manually removable. It is apparent that the head extends from the handle and that interiors of the head and the handle provide individual reservoirs interconnected through the elbow. It is also apparent that, when the filler cap is removed from the handle, the end of the handle opposite the elbow defines a filler opening, not shown, which is releasably closable by the filler cap. The reservoirs are conveniently fillable through this opening with liquid systemic herbicide for wiping on the weeds 15, the reservoirs typically being filled to a level somewhat above the elbow as indicated by the arrow 28.

Figure 2:
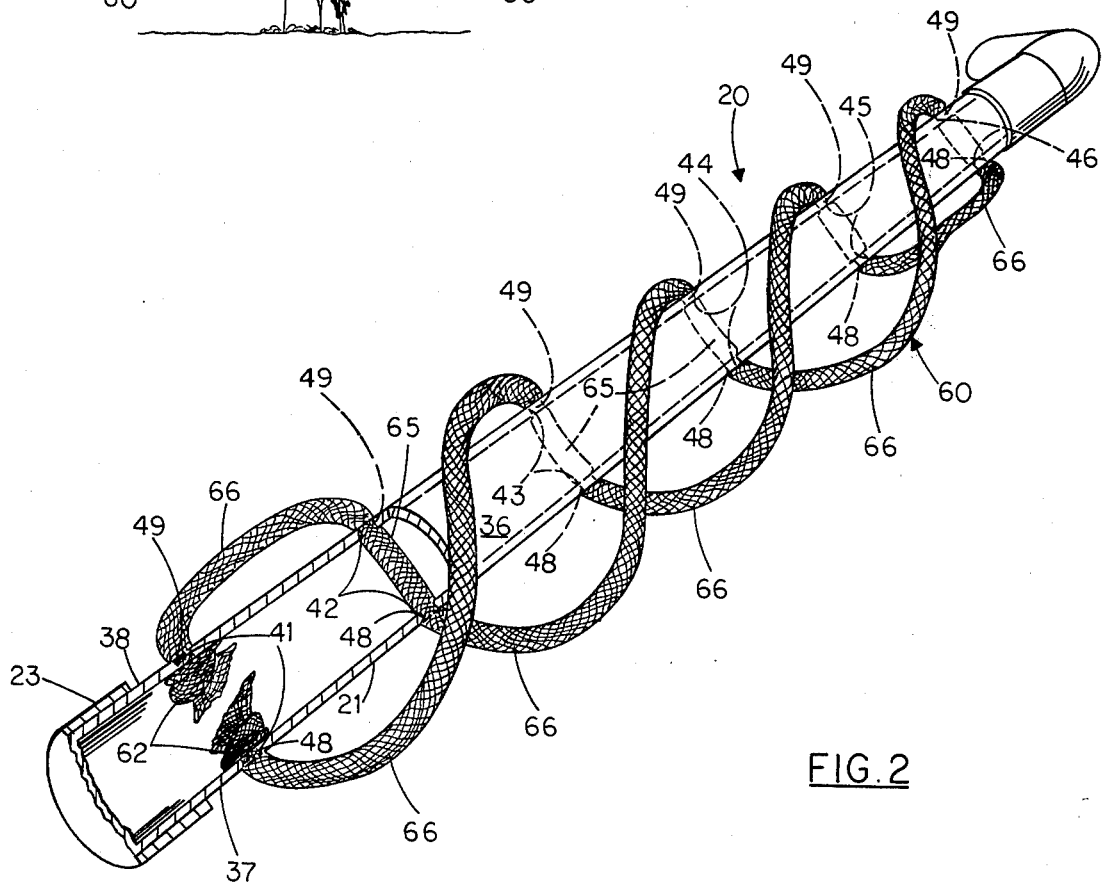
FIG. 2 is a bottom perspective view of a distributor head and related elements of the wand of FIG. 1.
Figure 3A:
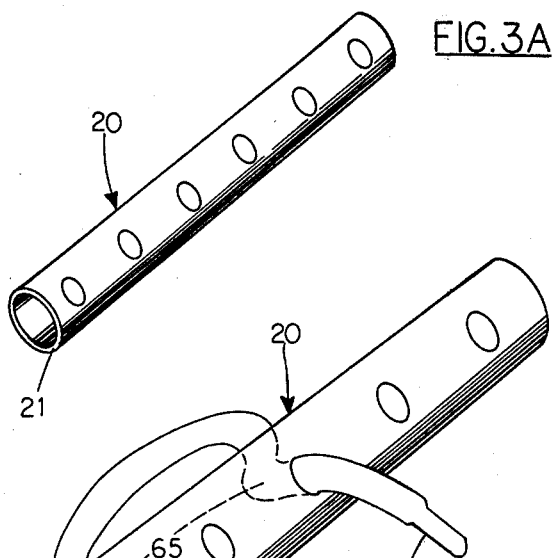
FIG. 3A through FIG. 3E illustrate sequential steps of a method of making the distributor head.
Figure 3B:
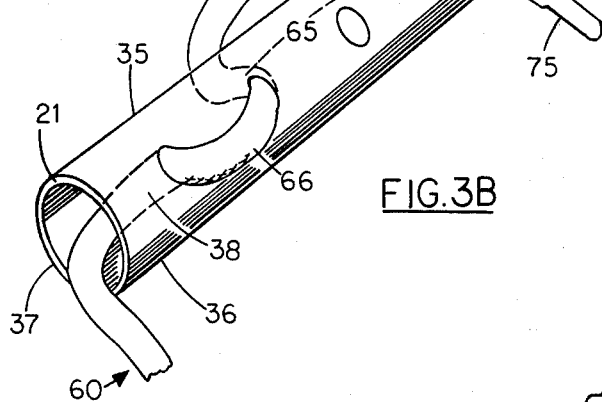

The elements of the wand 10, the relations therebetween, and the use thereof just described are generally similar to those of the prior wand. The distributor head 20 of the wand of the present invention, as best shown in FIGS. 1, 2 and 3B, has a predetermined upper side or quadrant 35, disposed generally in the direction the handle 25 extends from the head, and has an opposite lower side or quadrant 36. These sides are separated by a pair of opposite quadrants 37 and 38, the quadrant 37 being designated as the forward side of the head and the opposite quadrant 38 as the rearward side of the head.

The head 20 has six aligned pairs, 41 through 46, of forward bores 48 and rearward bores 49. The bores are of predetermined diameter and their walls are the polyvinyl chloride material of the head. The bores extend through the wall 21 of the head in a common axial plane which is disposed diametrically of the head so that the forward bore of each pair extends through the forward side 37 of the head and the rearward bore extends through the rearward side 38 of the head. The pairs are equally spaced along the head and are consecutively numbered for identification herein in a direction from the end of the head closed by the cap 23 toward the handle 25, the pair of bores 41 being designated as the first forward bore and the first rearward bore, and the bores of the other pairs being correspondingly designated consecutively so that, for example, the bores of the pair 46 are the highest even numbered bores and are designated as the sixth forward bore and the sixth rearward bore.

The wand 10 has an emitter 60 which is a single length of flexible, braided cord threaded through all of the bores 48 and 49 in direct slidable engagement with the walls of the bores. The cord is braided from somewhat elastic, plastic material, commercially available nylon braided cord being excellently suited to the practice of the subject invention. The thickness of the cord is such that its diameter is greater than that of the bores when the cord is untensioned and is smaller than the diameter of the bores when the cord is tensioned. The cord is thus directly engaged with the walls of each bore in substantially fluid-tight relation therewith when the cord is untensioned and the cord is slidably adjustably movable through the bore when tensioned. The cord has opposite ends 62 which are knotted and are disposed within the head in individually adjacent relation to the bores of the pair 41. The cord extends in opposite directions outwardly of the head from these ends through the bores of this pair. It is apparent that the knotted ends are within the herbicide reservoir provided by the tubular distributing head. It is also apparent that, since the cord is threaded through the bores, the cord has a plurality of immersion loops or portions 65, those portions of the cord within the head, and that the cord has a plurality of distributing loops or portions 66, which are those portions of the cord externally of the head. Each distributing portion adjacent to one of the bores is, therefore, continuous with the immersion portion through the one bore.

The cord 60 is successively threaded through the bores 48 and 49 in specific manner shown in FIG. 2. The cord extends outwardly through the first of the rearward bores 49, the rearward bore of the pair 41 of bores, from the one of the knotted ends 62 inwardly adjacent to this rearward bore. From this bore the cord extends outwardly of the head 20 along its rearward side 38 to the second rearward bore, which is the rearward bore of the pair 42. The cord continues inwardly through the second rearward bore and across the interior of the head to the one of the forward bores 48 of the pair 42, that is, the second forward bore. The cord passes outwardly through this second forward bore and then continues in a generally helical path externally of and adjacent to the lower side 36 of the head beneath the third pair 43 of bores to the rearward bore of the fourth pair 44. From this rearward bore the cord extends across the interior of the head to the opposite or forward bore of the fourth pair, and from this latter bore the cord continues in a generally helical path externally of and adjacent to the lower side beneath the fifth pair of bores 45 to the rearward bore of the sixth pair thereof and through the interior of the head to the forward bore of the sixth pair. The cord extends from the last mentioned bore along the forward side 37 of the head to the forward bore of the fifth pair 45 of bores and then passes into the head through this forward bore to the rearward bore of the fifth pair and to exterior of the head at its rearward side. The cord then extends in a generally helical path below and adjacent to the lower side of the head beneath the fourth pair 44 of bores to the forward bore of the third pair 43 and from thence through the head to the rearward bore of the third pair. From this rearward bore the cord passes in a generally helical path adjacent to and externally of the lower side beneath the second pair 42 of bores to the forward bore of the first pair 41 of bores. The cord extends through the last identified bore to the knotted end 62 adjacent thereto, terminating at this end at which the cord is knotted within the reservoir inwardly of the first forward bore, and within the head. From the foregoing description and FIG. 2, it is apparent that the cord 60 extends, from the forward bore of the second pair, successively downwardly about the head beneath each odd numbered pair of aligned bores and successively through the highest even numbered bores from the rearward to the forward thereof and, after passing through the highest odd numbered bores, extends successively downwardly about the head beneath each even numbered pair of aligned bores and successively through the aligned odd numbered pairs of bores from the forward to the rearward thereof.

METHOD OF MAKING

A herbicide wand 10 embodying the subject invention is conveniently, economically, and rapidly made by a method to which attention is invited, this method being illustrated sequentially in FIGS. 3A to 3E. First, the tubular head 20 is first constructed in the configuration shown in FIG. 3A by forming the pairs 41 through 46 of aligned bores 48 and 49 in the head. The proper spacing of the pairs and the alignment of the bores is conveniently achieved by drilling through guide bores, which correspond to such pairs of aligned bores, in a template of pipe, not shown, which has an inside diameter such that it is slidably fittable over the outside of the head.

Figure 3C:
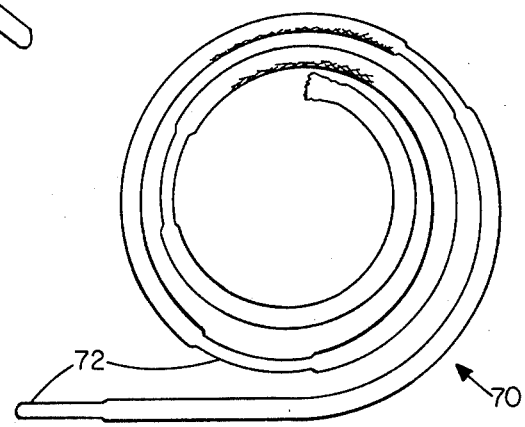

Next, as illustrated in FIG. 3B a length 70 of the braided nylon cord material utilized for the cord 60 is provided. This length extends a distance which is a multiple of the length of a cord plus a substantial extra length. The cord has an unstressed diameter greater than the diameter of the bores 48 and 49. Sections 72 of the length of cord material are heated which, due to the inherent properties of such a material, results in the sections being externally glazed, reduced in diameter, and made substantially rigid. The diameter of the sections can be further reduced mechanically, as by grinding, if desired. The sections are spaced apart a distance greater than the length of the cord and each section has a length which is substantially greater than the diameter of the head 20. The length 70 is then severed at corresponding ends of the sections so that each severed portion is, as shown in FIG. 3C, a length of the cord 60 having the attached rigid section as a lacing needle 75.

The needle 75 is then passed successively through the bores 48 and 49 lacing the cord 70 therethrough in the disposition previously described to form the inversion portions 65 of the cord successively within the head in continuous relation with the distributing portions 66.

Figure 3D:
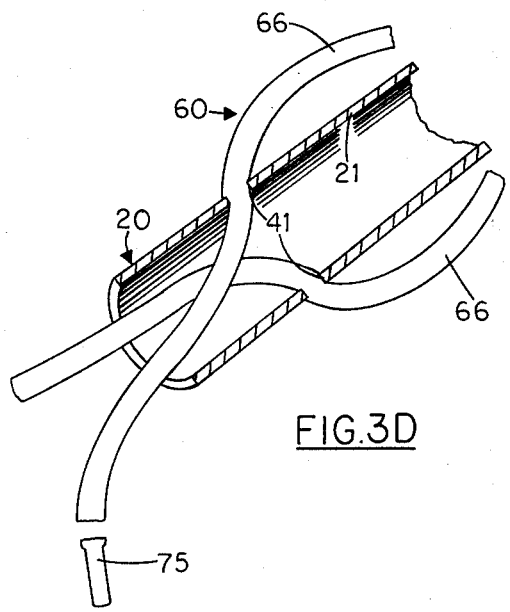

The needle 75 is next severed from the cord 60 which has been laced through the bores 48 and 49 with the opposite ends 62 of the cord extended individually inwardly through the first pair 61 of bores. The cord and the portion of the head 20 then adjacent to this pair of bores appear as shown in FIG. 3D.

Figure 3E:
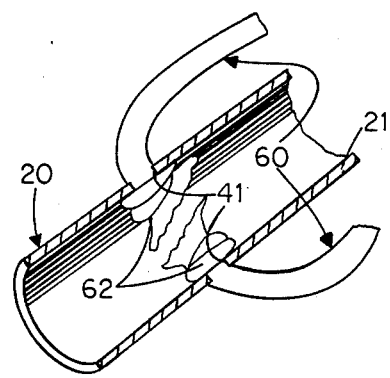

Finally, the ends 62 are knotted in the manner previously described and tensioned against the internal surface of the head 20 as best shown in FIG. 3E. It is apparent that the method just described serves to install the cord 60 through the wall 21 in a properly fitted relation which controls the flow of herbicide from the head without waste or leakage and which allows the cord to move somewhat in relation to each bore 48 and 49.

OPERATION

The operation of the described embodiment of the subject invention is believed to be clearly apparent and is briefly summarized at this point. Initially, the reservoirs within the head 20 and the handle 25 of the wand 10 of the subject invention are supplied with liquid herbicide. The immersion portions 65 are thus immersed in the herbicide which is carried by capillary action along the cord 60 through the bores 48 and 49 to the distributing portions 66 so that the distributing portions are wetted with herbicide so long as a supply remains in the reservoirs. It is apparent from FIG. 1 that the distributing portions are disposed downwardly of the head for engagement of the weeds 15 to wipe herbicide thereon, the herbicide so removed from the distributing portions being replaced by capillary action from the immersion portions. The engagement of the cord with the walls of the bores prevents direct leakage and dripping of herbicide from the reservoirs along the walls of the bores externally of the cords, thereby conserving herbicide and preventing its misapplication to crops since herbicide can only escape from the wand by contact with the distributing portions. As a result, the supply of herbicide to the wand is self-regulating.

When the wand 10 is in use the wiping action of the distributing portions 66 against the weeds 15 is not perfectly regular in time, but depends on the distribution of weeds and the activity of a user of the wand 10. As the distributing portions engage and disengage the weeds during such wiping action, the cord is correspondingly tensioned and released through the bores 48 and 49, this tensioning and releasing being aperiodic due to the irregularity of the wiping action.

Since the unstressed cord 60 is larger in diameter than the walls of the bores 48 and 49, the cord frictionally engages the bores and tends to be retained in its existing disposition relative to the bores. The relative lengths of each immersion portion and each distributing portion thus do not change significantly during herbicide application unless, of course, the cord is snagged on a relatively rigid weed or other obstruction. However, these relative lengths can be selectively altered by tensioning the cord at the appropriate bores and then moving the cord lengthwise therethrough since the cord is slidably adjustable through the bores when tensioned. The relative lengths of the distributing portions can thereby be adjusted for wiping herbicide on weeds of different types and the selected relative lengths restored if the portions become snagged or gradually altered during normal wiping action.

Although the invention has been shown and described in what is conceived to be the most practical and preferred apparatus and method for making the same, it is recognized that departures may be made therefrom within the scope of the invention, which is not to be limited to the illustrative details disclosed.

Having described my invention, what I claim as new and desire to secure by Letters Patent is:

1. In a wand for applying systemic herbicide having a tubular handle and an elongated tubular distributor head extended from the handle, the handle and distributor head having interconnected reservoirs for herbicide and a releasably closable filler opening, the distributor head having an even number of pairs of diametrically aligned bores therethrough of predetermined diameter disposed in a common plane, the head having a predetermined upper side and a lower side and each pair of bores having a forward bore and a rearward bore and each pair being consecutively numbered from one end of the head; and a single length of braided cord having a diameter greater than that of the bores when untensioned and a diameter smaller than said bores when tensioned, the cord having a knotted end within the reservoir, extended successively outwardly through a first rearward bore, outwardly along the rearward side of the head to the second rearward bore, inwardly through the second rearward bore, outwardly through the second forward bore, successively downwardly about the head beneath each odd numbered pair of aligned bores and successively through the aligned highest even numbered bores from the rearward to the forward thereof, and from the highest even numbered bores along the forward side of the head to the highest odd numbered pair of bores and therethrough from the forward bore through the rearward bore and thence successively downwardly about the head beneath each even numbered pair of aligned bores and successively through the aligned odd numbered bores from the forward to the rearward thereof and being knotted within the reservoir inwardly of the first forward bore, the cord being directly engaged with the walls of the bores in substantially fluid-tight engagement therewith when untensioned and being slidably adjustably movable therethrough when tensioned.

2. The wand of claim 1 in which the cord is nylon and the head is polyvinyl chloride.

* * * * *

UNITED STATES PATENT AND TRADEMARK OFFICE
CERTIFICATE OF CORRECTION

PATENT NO. : 4,389,812
DATED : June 28, 1983
INVENTOR(S) : Swen A. Panttaja

It is certified that error appears in the above-identified patent and that said Letters Patent are hereby corrected as shown below:

Column 2, line 18, change "single" to ---simple---.

Signed and Sealed this

Sixteenth Day of August 1983

[SEAL]

Attest:

GERALD J. MOSSINGHOFF

Attesting Officer    Commissioner of Patents and Trademarks